Nov. 9, 1965   A. E. STURZENEGGER   3,217,197
ELECTROMAGNETIC COUPLING APPARATUS
Filed Dec. 26, 1961   6 Sheets-Sheet 1

INVENTOR.
ALFRED E. STURZENEGGER
BY Williams, David, Hoffmann & Yount
ATTORNEYS

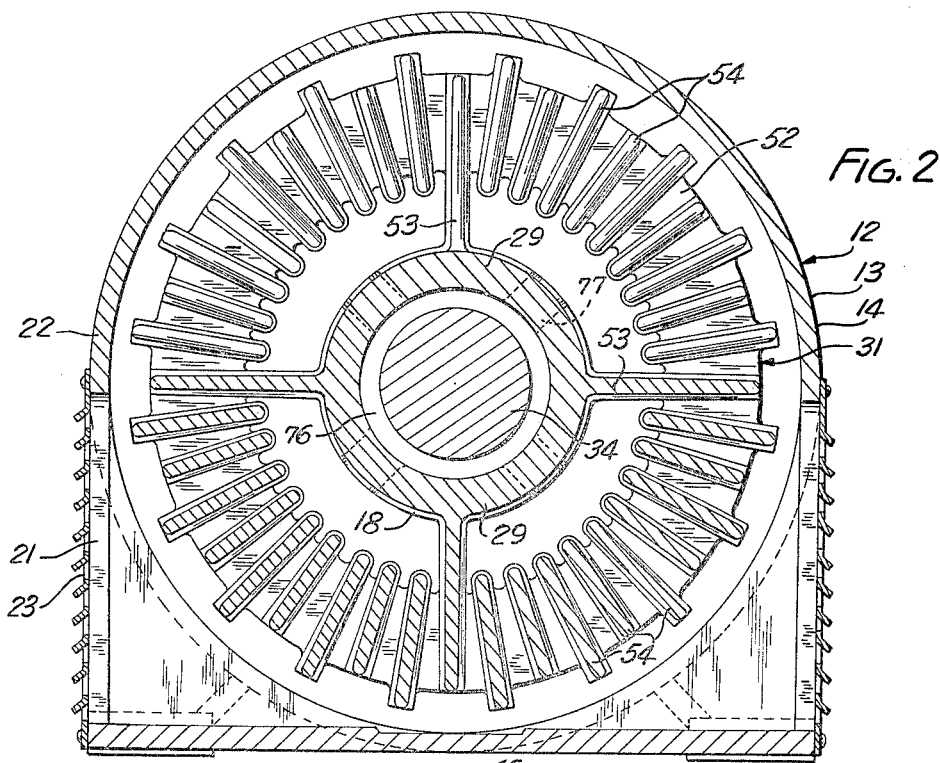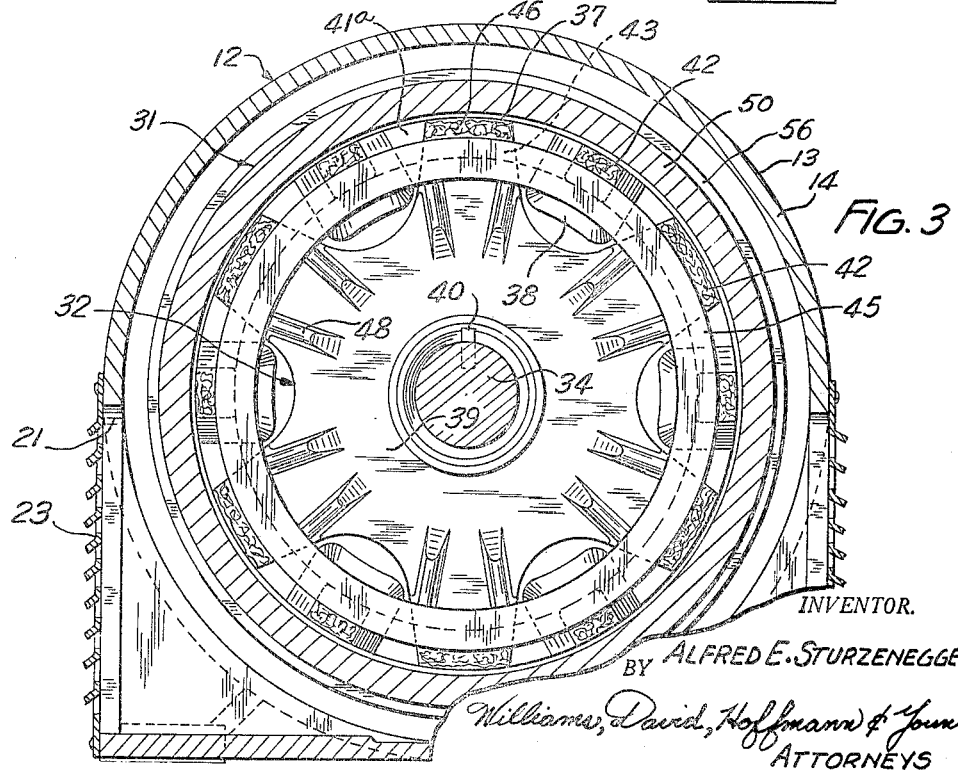

INVENTOR.
ALFRED E. STURZENEGGER
BY
Williams, David, Hoffmann & Yount
ATTORNEYS

INVENTOR.
ALFRED E. STURZENEGGER

Nov. 9, 1965  A. E. STURZENEGGER  3,217,197
ELECTROMAGNETIC COUPLING APPARATUS
Filed Dec. 26, 1961  6 Sheets-Sheet 5
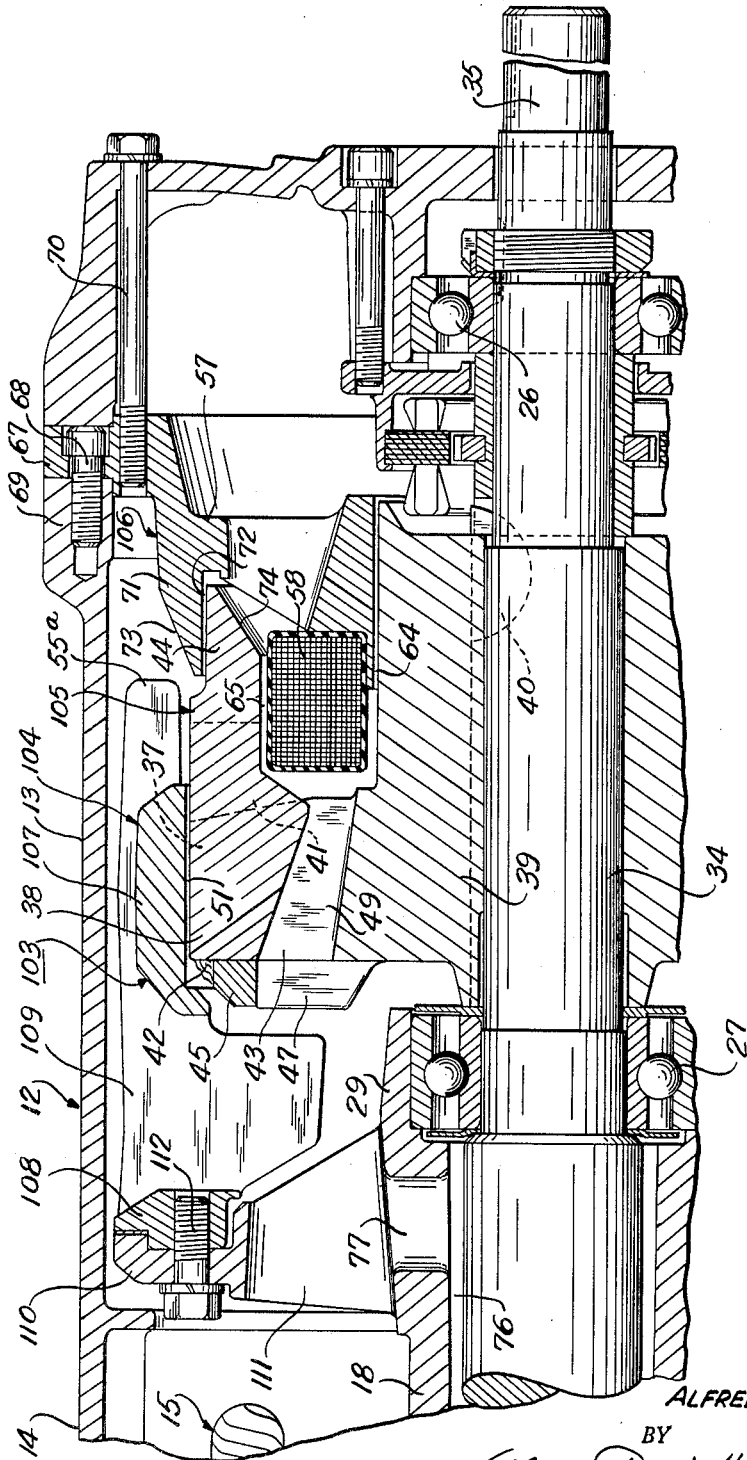
FIG. 7
INVENTOR.
ALFRED E. STURZENEGGER
BY
ATTORNEYS

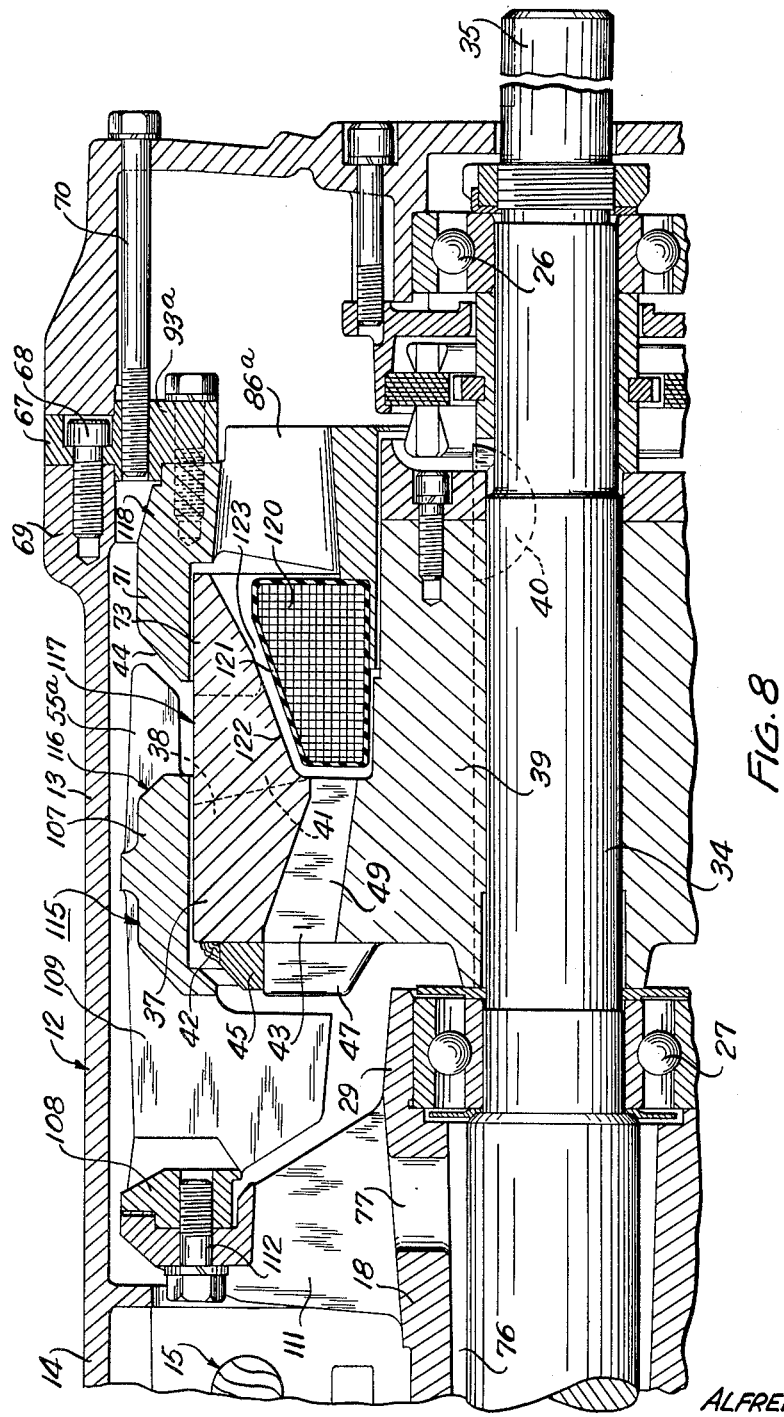

United States Patent Office 3,217,197
Patented Nov. 9, 1965

3,217,197
ELECTROMAGNETIC COUPLING APPARATUS
Alfred E. Sturzenegger, Kenosha, Wis., assignor to Eaton Manufacturing Company, Cleveland, Ohio, a corporation of Ohio
Filed Dec. 26, 1961, Ser. No. 161,790
21 Claims. (Cl. 310—105)

This invention relates to rotatable electromagnetic coupling apparatus and, as one of its objects, provides a novel construction for coupling apparatus of this kind for achieving an efficient operation and which can be used to advantage in various power transmission applications and particularly in motor-driven variable-speed coupling units.

Electromagnetic coupling apparatus of this type comprises co-operating relatively rotatable power input and power output rotors in association with a field means. Two important problems have repeatedly been encountered in such coupling apparatus with respect to, first, an adequate cooling thereof and, second, a delayed operating response and sluggish regulation due to inertia effects in the power output rotor. Satisfactory treatment of these problems has heretofore been hindered by the structural requirements of apparatus of this kind and particularly by the structural and flux-path requirements for the field means.

The magnetic circuit in coupling apparatus of this kind is formed largely by components of the power output rotor which usually include pole members of the interdigitated type and an associated pole ring means connected with one group of such pole members. The power output rotor is usually of considerable mass and, since the pole members and the associated pole ring means are located at a substantial radial distance from the rotation axis, the output rotor is susceptible to inertia effects tending to cause a delayed operating response and a sluggish regulating action.

In the coupling apparatus of this invention the mass of the output rotor has been considerably reduced, with a corresponding decrease in the inertia effects and the achievement of better operating characteristics, and this has been accomplished by employing field means of such construction and co-operative location relative to the power output rotor and the field energizing coil means as to permit a substantial axial shortening of the latter particularly with respect to the pole ring means thereof. The novel construction for the field means and the co-operative location thereof relative to the power output rotor has also made possible the achievement of a highly effective flow of colling air through the coupling apparatus.

The axial shortening of the power output rotor has also been achieved to a substantial extent by providing, on a stationary field member, an annular pole ring portion in an external surrounding relation to the field energizing coil. By providing such a surrounding external pole ring portion on the stationary field means, a correspondnig shortening of the pole ring means of the power output rotor is made possible for achieving the reduced inertia effect on the latter and, at the same time, a desired opposed relation is obtained for co-operative portions of such pole ring portion and pole ring means for good flux flow therethrough.

It is therefore another object of this invention to provide a novel construction for electromagnetic coupling apparatus by which inertia effects have been substantially reduced and by which an efficient flow of cooling air through the apparatus is achieved.

A further object is to provide novel electromagnetic coupling apparatus of the character above indicated and having field means which includes a stationary pole ring portion in an external surrounding relation to a field coil means and in a co-operative opposed relation to a portion of the power output rotor, preferably an external axial overlap relation with respect to pole ring means of the output rotor, such that an axial shortening of the output rotor and a decrease in the mass thereof have been achieved together with the advantages of reduced inertia effects on the output rotor for more prompt operating response and a better regulating action.

Still another object is to provide novel electromagnetic coupling apparatus of the kind above referred to and having a stationary field member which includes an outer annular pole portion in a surrounding relation to an adjacent portion of an associated rotor, and which field member has air passages therein located inwardly of the annular pole portion for cooling of the field means and for communicating connection with air passages provided in the associated rotor.

Additionally, this invention provides electromagnetic coupling apparatus embodying novel features which include means for more effectively isolating the antifriction bearing means of the rotors against the transfer of heat thereto, means for a more effective flow of cooling air through the apparatus by causing streams of such air to enter the rotor means by a substantial axial flow thereinto from opposite ends thereof, and means by which the field means is supported in a more satisfactory co-operative relation to the associated rotor means and with reduced leakage of flux from the field means.

Other novel characteristics, new results and advantages of this invention will be apparent in the following detailed description and in the accompanying drawings forming a part of this specification and in which, FIG. 1 is a partial axial section taken through electromagnetic coupling apparatus embodying this invention;

FIGS. 2, 3 and 4 are transverse sections taken through the apparatus on section lines 2—2, 3—3 and 4—4 respectively of FIG. 1;

FIG. 7 is another partial axial section similar to that of FIG. 1 but showing another modified construction with respect to the power input rotor means; and FIG. 8 is a view similar to that of FIG. 7 with respect to the showing of the power input rotor means and also showing a further modified construction for the field means of the apparatus.

Figure 1:
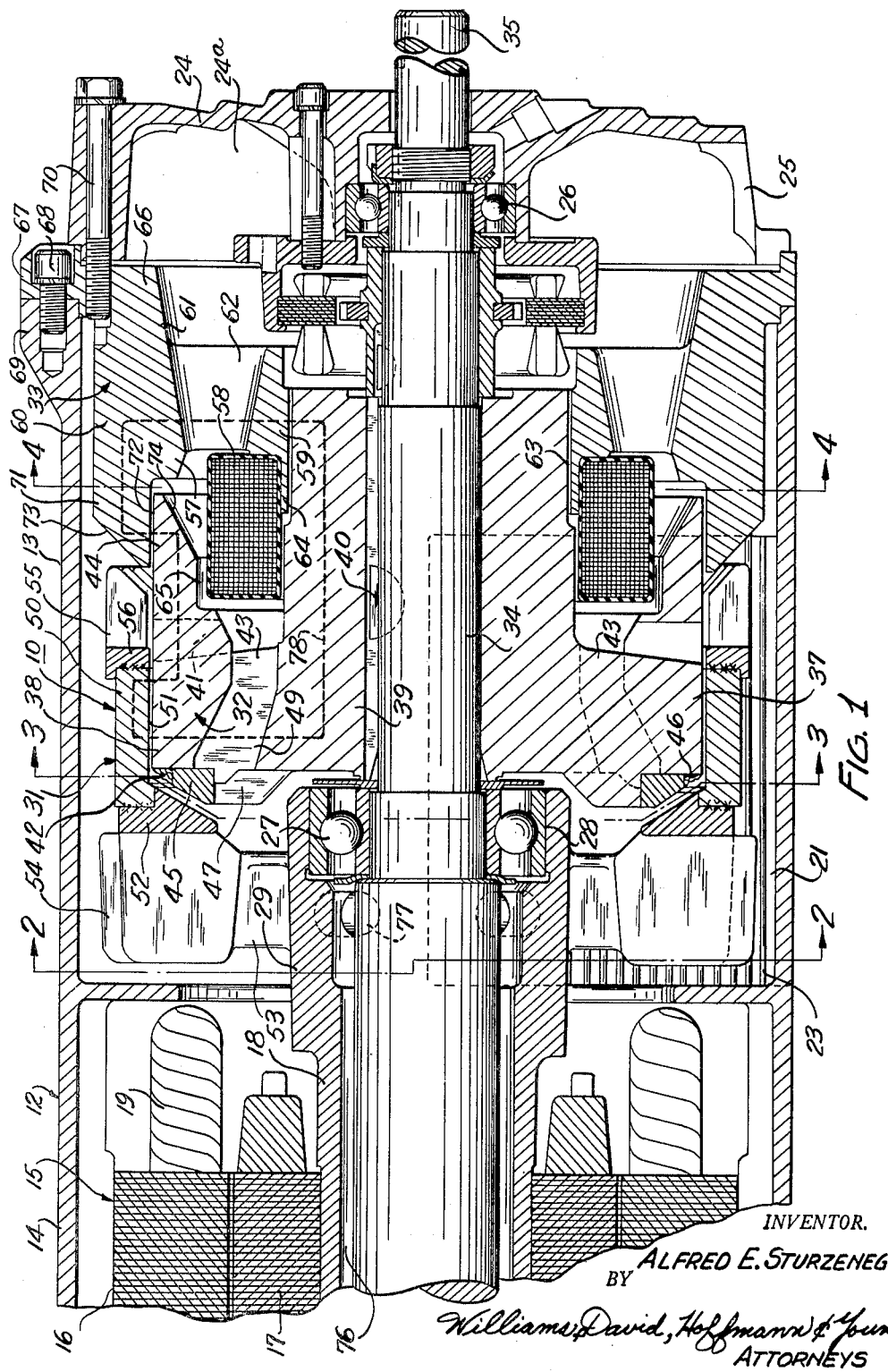
Figure 4:
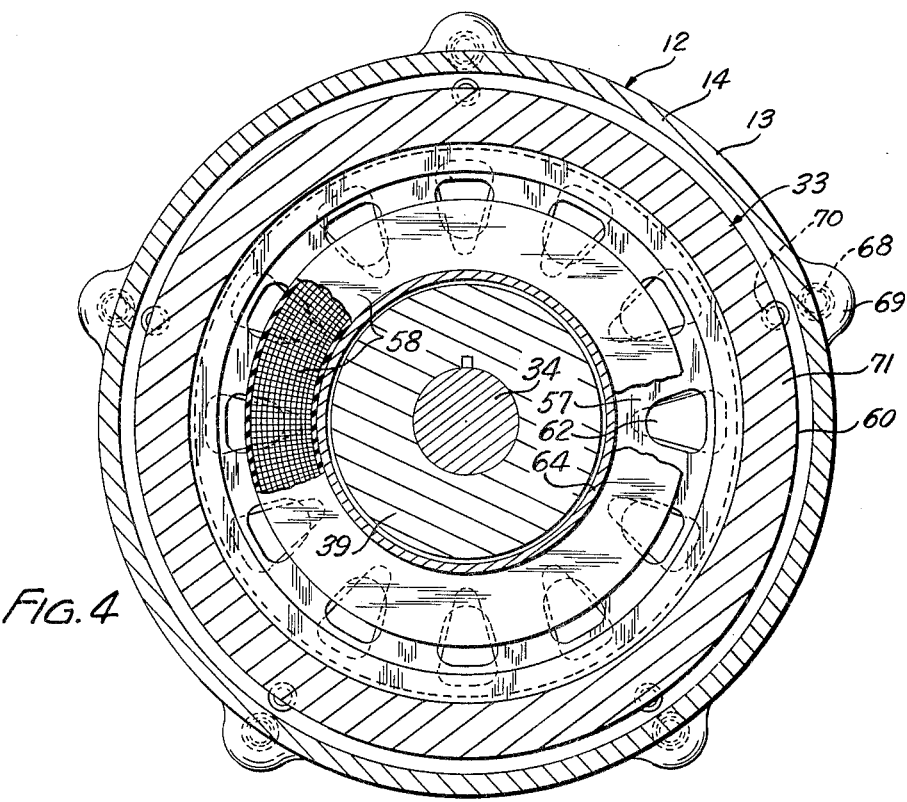

The accompanying drawings show the electromagnetic coupling apparatus 10 of this invention embodied in a motor-driven variable-output power mechanism having a housing 12 containing a coupling section 13 and an electric motor section 14 in an axially adjacent relation.

The motor section 14 contains an electric drive motor 15 of a conventional construction comprising a stator 16 mounted in the housing 12 and a rotor 17 secured on a shaft 18 which is shown as being a hollow or quill shaft. The stator 16 and the rotor 17 are shown as being of a laminated construction and the stator member is provided with suitable field windings 19.

The coupling section 13 of the housing 12 is provided at a plurality of points, in this case on opposite sides thereof, with air outlet openings 21 in the external wall 22 of the housing (see FIGS. 2 and 3) and which outlet openings are preferably shielded by louvered cover members 23. The housing 12 is provided at opposite ends thereof with cover members containing suitable air inlet openings, one such cover member 24 and air inlet opening 25 being shown in FIG. 1 at the right end of the housing. Suitable support bearings are provided in the housing 12 for rotatably mounting the coupling apparatus 10 and the rotor 17 of the drive motor 15 therein and which bearings include an antifriction bearing 26 located in the cover member 24 and an intermediate antifriction bearing 27 mounted in a socket 28 of the hub-shaped inner end 29 of the hollow shaft 18.

The coupling apparatus 10 comprises co-operating relatively rotatable rotors, in this case outer and inner rotors 31 and 32, and a field means 33 in a co-operative relation to such rotors. The coupling apparatus 10 also comprises a shaft 34 which, in this case, is an inner shaft extending through the hollow outer shaft 18. The outer and inner rotors 31 and 32 are connected respectively with the outer and inner shafts 18 and 34 and the latter shaft is here shown as having an end portion 35 projecting from the cover member 24.

When the coupling apparatus 10 is driven by the motor 15 the shaft member 18 is the power input shaft and the shaft member 34 is a power output shaft whose projecting end portion 35 is adapted to be connected with a load to be driven. The coupling apparatus 10 can, if desired, be driven by power applied to the shaft portion 35 in which case the shaft 34 would be the power input shaft and the shaft 18 would be the power output shaft.

The inner rotor 32 comprises an annular series of pole members 37 and 38 (see FIGS. 1 and 3) disposed around and carried by an inner hub member 39 which is secured to the shaft 34 as by means of a key 40. The pole members 37 and 38 comprise two groups of pole members disposed in an interdigitated relation with adjacent pole members of the series separated by portions of radially extending air passages 41 provided in the rotor 32.

The pole members 37 are formed by the outer end portions of radial arms 43 projecting from the hub member 39 and the pole members 38 are formed by axially projecting tooth-like portions of an annular pole ring means 44. The pole members 38 and the pole ring means 44 are supported by the arms 43 of the hub member 39 by the provision of a support ring 45 on such arms and to which the adjacent ends of the pole members 38 are secured as by suitable welds 42. The support ring 45 is connected to the arms 43 as by welds 46 and is seated on shoulders formed by blades 47 projecting from the arms.

Figure 5:
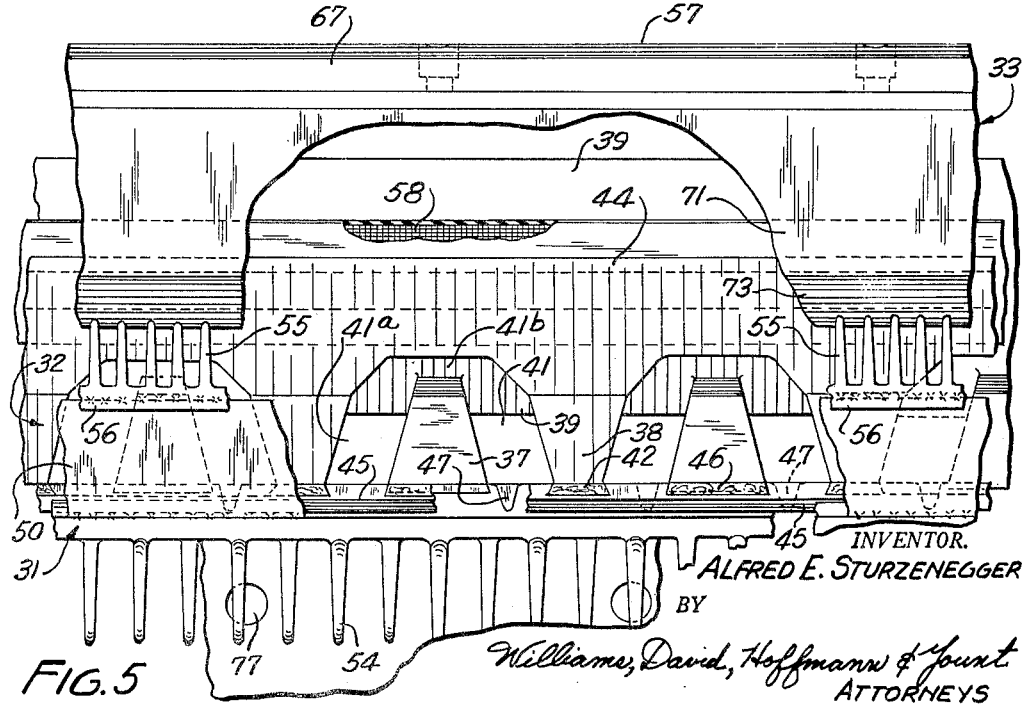
FIG. 5 is a partial plan view as a development of the machine components comprising the power input and output rotors and the associated field means and with portions of these components broken away.

The radial air passages 41 provided in the rotor 32 comprise intervening passage portions 41$^a$ located between the pairs of adjacent pole members 37 and 38 and other passage portions 41$^b$ by which the pole ring means 44 is spaced from the pole members 38 as shown in FIG. 5. The inner ends of the radial passage portions 41$^a$ and 41$^b$ are connected with axial air passages 49 which extend into the rotor 32 past the blade projections 47 of the arms 43, as can be seen in the upper portion of FIG. 1.

The outer rotor 31 comprises annular inductor means here shown as being an eddy-current drum member 50 located in an opposed co-operative relation to the annular series of pole members 37 and 38, in this case, in a radially disposed surrounding relation to such pole members and separated therefrom by an intervening air gap 51. The rotor 31 also comprises a support ring 52 to which the drum member 50 is suitably secured as by welded connection thereto and which support ring is carried by spider arms 53 provided on the hub portion 29 of the shaft 18 (see FIG. 2). The segments of the support ring 52 which extend between the spider arms 53 carry air impelling blades 54 projecting therefrom in an axial direction away from the drum member 47.

The rotor 31 also comprises an annular series of heat diffusing and air impelling blades 55 carried by the drum member 47 and located on the axial side thereof opposite from the air impelling blades 54. The blades 55 project toward the field means 33 and are connected with the drum member 50 by means of a base ring 56 which is secured to the drum member as by a welded connection therebetween. The blades 55 are disposed in a surrounding relation to the inner rotor 32 so as to be movable across outer end portions of the radial air passages 41 of such inner rotor.

The field means 33 is an important part of the novel coupling apparatus 10 and will be described next. The field means 33 comprises a field member 57, in this case a stationary field member, and coil means 58 supported by such field member. The field member 57 is a ring-shaped member having inner and outer annular portions 59 and 60 connected by an intermediate body portion 61 containing an annular series of axially extending air passages 62.

The inner annular portion 59 is disposed in an adjacent surrounding relation to the hub member 39 with an intervening annular air gap 63 therebetween. The inner annular portion 59 includes an axially projecting annular flange forming a support ledge 64 for supporting the coil means 58. The coil means 58 is here shown as being a ring-shaped coil received on the ledge 64 and suitably retained thereon with a substantial portion of the coil means projecting beyond the ledge and located in a surrounding relation to the intermediate portion of the hub member 39. The axially projecting portion of the coil means 58 extends into the inner rotor 32 and is accommodated therein by the annular space 65 within the pole ring means 44.

The body portion 61 of the field member 57 includes an annular end portion 66 at the outer axial end thereof and which has a radially projecting annular mounting flange 67 thereon. The field member 57 is mounted on the housing 12 as by means of attaching screws 68 extending through the mounting flange 67 and having threaded engagement in bosses 69 of the housing. The end cover 24 of the housing 12 is here shown as being secured against the end portion 66 of the field member by suitable connecting screws 70.

The outer annular portion 60 of the field member 57 includes a pole ring portion 71 located in an opposed co-operative relation to the pole ring means 44 of the inner rotor 32. The pole ring portion 71 is preferably disposed in an external surrounding and axially overlapped relation to the pole ring means 44 of such inner rotor and is spaced therefrom by an annular air gap 72. The pole ring portion 71 is also located radially outward of, and in a surrounding relation to, the coil means 58.

The construction just described is very important and advantageous in the coupling apparatus 10 because it makes possible a substantial reduction in the axial length of the pole ring means 44 of the inner rotor 32 whereby the mass of this rotor can be kept to a minimum value and inertia effects therein can thereby likewise be kept to a corresponding minimum value. That such an axial shortening of the rotor 32, and particularly of the pole ring means 44 thereof, is effective for reducing inertia effects will be readily recognized from the fact that the pole ring means 44 is spaced a substantial radial distance from the common rotation axis of the shaft members 18 and 34 and from the fact that kinetic energy changes in the different portions of the rotor 32 vary with the square of the radial distance of those portions from the rotation axis.

The external overlap relation of the pole ring portion 71 of the field member 57 is also important in achieving a desirable compact assembly relationship between the field means 33 and the rotor 32. This will be recognized from the fact that when the pole ring portion 71 is located in an outwardly surrounding relation to the pole ring means 44, the annular space 65 within this pole ring means is available to receive the above-mentioned axially projecting end portion of the coil means 58.

This external surrounding relation for the pole ring portion 71 also locates the latter in an axially spaced relation from the adjacent end of the drum member 50 of the outer rotor 31 so as to accommodate therebetween the annular series of air impelling blades 55. The end of the pole ring portion 71 which is presented toward the blades 55 is beveled therearound as indicated by the annular taper 73 and the overhang weight of the field member 57 is thereby substantially reduced.

Additionally, it will be seen that the location of the pole ring portion 71 in this external surrounding relation to the adjacent portion of the rotor 32 locates the outer annular portion 60 of the field member 57 a sufficient radial distance from the inner annular portion 59 so as to accommodate the annular row of axially extending air passages 62 therebetween. The passages 62 can accordingly be of a size to conduct a sufficiently large flow of air to effectively cool the field member 57, the coil means 58 and the rotors 31 and 32.

The above-described construction for the field member 57 also locates the air passages 62 so they will readily receive cooling air from an annular air intake chamber 24ª of the cover member 24 as the result of a flow of such air induced by the impeller blades 55. The location of the passages 62 is also such as to direct the cooling air across the coil means 58 and into the inner portions of the radial passages 41 through the internal annular space 65. The flow of air over the coil means 58 and into the annular space 65 is facilitated by an internal annular bevel 74 on the pole ring means 44.

Cooling air also enters the inner rotor 32 from the other end thereof through the above-described axial passages 49 and flows into the inner portions of the radial passages 41. The air which flows into the radial passages 41 from the axial passages 49 and 62 passes through the row of blades 55 and is discharged by the latter through the housing openings 21.

Cooling air also enters the housing 12 at the motor end thereof and a substantial portion of such air is drawn through the electric motor 15 by the action of the blades 54 of the spider means 53. Another portion of such cooling air flows axially through the air passage 76 of the hollow shaft 18 and then radially outward through the openings 77 of the hub portion 29. The major portion of the cooling air flowing through the motor 15 and the shaft passage 76 is discharged through the housing openings 21 by the impeller blades 54 and a lesser portion of such air flows into the inner rotor 32 through the above-mentioned axial passages 49. The portions of the cooling air which flow over and through the shaft hub 29 will effectively cool the bearing 27. The movement of air into the axial passages 49 of the rotor 32 is assisted by the blades 47 of the arms 43.

The above-described components of the rotors 31 and 32, together with the field member 57, provide a magnetic circuit of good flux-carrying capability and adequate area and whose path is indicated diagrammatically by the broken line 78 in FIG. 1. The magnetic flux produced by the coil means 58 readily traverses this path in amounts depending upon the extent of the electrical energization of the coil means. The magnetic circuit portions or members 37, 38, 39, 43, 44, 50 and 57 comprise suitable magnetic material such as ferromagnetic material.

In the operation of the coupling apparatus 10 the rotor 31 is driven by the motor 15 while the field coil means 58 is maintained energized to an extent to provide the desired coupling effect between the rotors 31 and 32. Relative slippage between the rotors 31 and 32 produces the coupling effect by inducing eddy-currents in the drum member 50. The coupling action thus produced between the rotors 31 and 32 causes the latter rotor to drive the shaft 34 for delivery of power thereby through the projecting shaft portion 35.

From the construction and operation of the novel coupling apparatus 10 as above described it will be readily recognized that this apparatus is of a very compact form and will operate with relatively low inertia effect on the power output rotor 32 so as to consequently have a prompt response characteristic and a good regulating action. In addition, the novel coupling apparatus 10 will be satisfactorily cooled by an effective flow of air therethrough during such operation.

Figure 6:
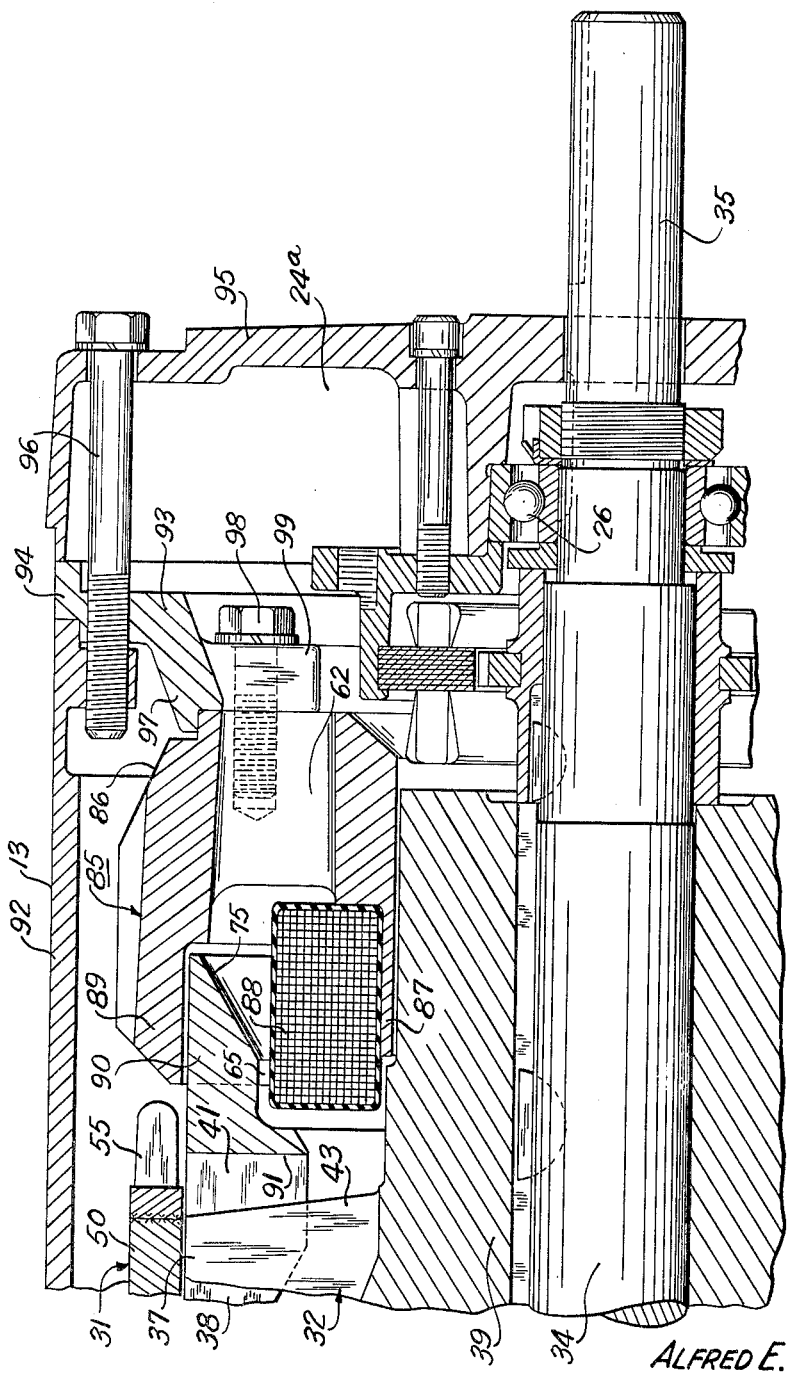
FIG. 6 is a partial axial section similar to that of FIG. 1 but showing a modified construction with respect to the field means and the supporting means therefore.

FIG. 6 of the drawings shows a modified form of electromagnetic coupling apparatus 85 having a stationary field member 86 of a somewhat different specific form than the field member 57 of the coupling apparatus 10 described above. The field member 85 is similar to the field member 57 in that it includes an inner annular coil support ledge 87 for supporting an annular field coil 88 and includes a pole ring portion 89 in an external axial overlap relation to pole ring means 90 of a power output rotor 91, but differs from the field member 57 in that it is connected with the housing 92 by means of a separate support ring 93. The body of the field member 86 comprises a suitable magnetic material, such as a ferromagnetic material, but the support ring 93 is made of a non-magnetic material, such as aluminum, so as to reduce or minimize flux leakage between the field means and the housing 92.

The support ring 93 is here shown as having an external annular rim portion 94 interposed between the housing 92 and the adjacent end cover member 95 and clamped therebetween by cover attaching screws 96. The support ring 93 is provided around the inner portion thereof with an axially converging flange portion 97 having an annular shoulder on the small end thereof which is engaged by the adjacent end of the field member 86. The field member 86 is secured to the support ring 93 by attaching screws 98 extending through lug projections 99 of the support ring. Various other members and portions of the coupling apparatus 85 which correspond with members and portions of the coupling apparatus 10 have been designated by the same reference numerals.

FIG. 7 of the drawings shows another modified form of electromagnetic coupling apparatus 103 having co-operating outer and inner rotors 104 and 105 of a construction and general arrangement similar to what have been described above for the rotors 31 and 32, and an associated field means 106. The field means 106 comprises field member and field coil components 57 and 58 generally similar to those of FIG. 1 and the field member 57 is connected with the housing 12 in a similar manner. To the extent that the members and portions of the coupling apparatus 103 are substantially the same as in the apparatus 10, the same reference numerals have been applied thereto.

The outer rotor 104 differs from the rotor 31 in that the drum-shaped inductor means 107 is connected with a support ring 108 by an annular series of air impelling blades 109 extending axially therebetween. The outer rotor 104 is connected with the shaft member 18 by having the support ring 108 secured to a mounting ring 110 which extends around, and is connected with, the hub portion 29 of the shaft 18 by spider arms 111. The support ring 108 is here shown as secured to the mounting ring 110 by connecting screws 112.

The air impelling blades 109 serve the same purpose as the above-described blades 54 of the coupling apparatus 10 and, as shown in FIG. 7, are formed integral with the drum member 107 and the support ring 108. Portions of the blades 109 extend across and beyond the drum member 107 to form an annular series of heat diffusing and air impelling blades 55ª in a similar location to the blades 55 of the coupling apparatus 10. The integral connection of the blades 109 with the drum member 107 and the support ring 108 simplifies the construction of the outer rotor 104 whereby the production thereof is facilitated as well as the assembly thereof in the coupling apparatus 103.

FIG. 8 of the drawings shows still another modified form of electromagnetic coupling apparatus 115 having co-operating outer and inner rotors 116 and 117 connected with the shafts 18 and 34 respectively and associated with a field means 118. The rotors 116 and 117, and the connection of the outer rotor 116 with the shaft member 18, utilize the novel construction shown in FIG. 7 and described above. To the extent that portions and members of the coupling apparatus 115 are substantially the same as in the couplings 10, 85 and 103, the same reference characters have been applied thereto.

The field means 118 of the modified coupling apparatus 115 comprises a field member 86ᵃ similar to the field member of FIG. 6 and an adapter ring 93ᵃ for supporting the field member and connecting the same with the housing 12, and field coil means 120 supported by the field member 86ᵃ. The coil means 120 is here shown as being an annular coil whose cross-sectional shape is different from the cross-sectional shape of the coil means 58 and 88 previously described. The field coil 120 is so formed that it has a peripheral annular bevel 121 extending therearound which lies in an adjacently spaced relation to a corresponding internal annular bevel 122 on the inner rotor 117. The annular bevels 121 and 122 are separated by an intervening annular air space 123 which also forms an air passage for a flow of cooling air past the coil and into the inner rotor.

The co-operating bevels 121 and 122 are both convergent bevels in relation to the common rotation axis of the shaft members 18 and 34 for movement along said common axis in a direction away from the field member 86ᵃ. By the provision of the bevel 121 on the coil 120 in this co-operating relation to the bevel 122 of the inner rotor 117, the coil is more readily and compactly accommodated in the coupling apparatus and contributes to the ease with which an overall axial shortening of the inner rotor can be accomplished for a desired reduction in the mass thereof and a corresponding reduction in inertia effects of such inner rotor.

From the accompanying drawings and the foregoing detailed description it will now be understood that this invention provides novel electromagnetic coupling apparatus of a compact and practical design wherein the construction of the field means and rotors and the co-operative relation therebetween produce various important new results including that of an improved functioning with more prompt response and better regulating action due to reduced inertia effects, and a more satisfactory cooling of the field means, rotors and associated bearings.

Although the electromagnetic coupling apparatus of this invention has been illustrated and described herein to a somewhat detailed extent it will be understood, of course, that the invention is not to be regarded as being correspondingly limited in scope but includes all changes and modifications coming within the terms of the claims hereof.

Having described my invention, I claim:

1. In electromagnetic coupling apparatus of the kind having magnetic circuit means including an annular series of rotatable pole members comprising groups of interdigitated pole members, and rotatable annular inductor means in a co-operative air-gap relation to said pole members; rotatable power input and power output shaft members having a common rotation axis; one of said shaft members having said pole members connected therewith and distributed therearound, and the other shaft member having said inductor means connected therewith; and field means comprising a stationary field member in the magnetic circuit of said circuit means, and annular coil means on said field member and energizable to cause flux to traverse said magnetic circuit; said magnetic circuit means also comprising a rotatable first annular pole ring means connected with one group of said pole members and extending in an axial direction away from said annular series; said field member comprising a second annular pole ring means located radially outward of said coil means and said first pole ring means and extending at least part way across said coil means and in a surrounding relation to said first pole ring means and in an axial direction toward said annular series; said first and second annular pole ring means having annularly coextensive adjacent end portions in an opposed co-operative air-gap relation in said magnetic circuit.

2. Electromagnetic coupling apparatus as defined in claim 1 wherein said magnetic circuit means has generally radial air passages therein between the interdigitated pole members, and generally axial air passages located in said field member for supplying air to inner portions of the radial air passages; the end portion of said first annular pole ring means being overlapped by the end portion of said second annular pole ring means and having a divergent annular taper on the inside thereof and facing toward said axial air passages.

3. Electromagnetic coupling apparatus as defined in claim 2 wherein said coil means is an annular coil means and said divergent annular taper is located in a surrounding relation to said annular coil means to facilitate flow of cooling air across the latter and toward said inner portions of said radial passages.

4. In electromagnetic coupling apparatus of the kind having magnetic circuit means including an annular series of pole members comprising two groups of interdigitated pole members separated by intervening portions of radial air passages provided in said magnetic circuit means, and rotatable annular inductor means extending around said series of pole members in a radially opposed air-gap relation thereto; rotatable power input and power output shaft members having a common rotation axis; a first support means connected with one of said shaft members on one axial side of said series of pole members and supporting said inductor means; said magnetic circuit means also comprising pole ring means lying on the other axial side of said series of pole members and connected with the pole members of one of said groups for rotation therewith; a second support means comprising another member of said magnetic circuit means mounted on the other of said shaft members and having both groups of said pole members connected therewith; portions of said pole ring means being spaced from the pole members of the other group by other portions of said radial air passages; and field means comprising a stationary field member in the magnetic circuit, and coil means on said field member and energizable to cause flux to traverse said magnetic circuit means; said field member being located on said other axial side of said series of pole members and having an inner portion in an annularly co-extensive air-gap relation to said second support means, and an outer annular portion extending toward said pole members radially outwardly of said coil means and said pole ring means and in a surrounding relation to said pole ring means and located in an opposed air-gap relation to said pole ring means.

5. Electromagnetic apparatus as defined in claim 4 wherein said inductor means and said outer annular portion of said field member have adjacent ends in an axially spaced relation for an outward delivery of air from said passages; and an annular series of air impeller blades connected with said inductor means and operable in the space between said adjacent ends for causing a flow of cooling air through said passages.

6. Electromagnetic apparatus as defined in claim 5 wherein said outer annular portion has an external annular bevel converging therealong in an axial direction toward said inductor means.

7. Electromagnetic coupling apparatus as defined in claim 4 wherein said field member has openings therein for supplying air to inner portions of said radial passages.

8. Electromagnetic coupling apparatus as defined in claim 7 wherein the openings of said field member comprise an annular series of openings extending axially through the field member between said inner and outer portions thereof.

9. Electromagnetic coupling apparatus as defined in claim 4 wherein said first support means and said field member have openings therein for supplying air to said radial passages from axially opposite sides of said annular series of pole members.

10. In electromagnetic coupling apparatus; a housing having air inlet and outlet openings; power input and power output shaft members supported in said housing and relatively rotatable on a common axis; rotor means connected with one of said shaft members and comprising an annular series of space pole members, and pole ring means projecting axially from said series and connected with alternate pole members of the series; said rotor means having air passages for a flow of cooling air therethrough; annular inductor means connected with the other shaft member and disposed in a co-operative flux-path air-gap relation to said annular series of pole members; and field means comprising an annular field member connected with said housing, and field coil means supported by said field member; said field member having an axially projecting pole ring portion in a surrounding co-operative flux-path air-gap relation to said pole ring means and an annular group of air supply openings located inwardly of said pole ring portion for supplying air to said air passages; said pole ring means having an internal annular bevel disposed with the maximum diameter portion presented toward said openings to facilitate the flow of air from said openings to said air passages.

11. In electromagnetic coupling apparatus; a stationary housing; power input and power output shaft members supported in said housing and relatively rotatable on a common axis; an annular series of rotatable pole members comprising two groups of interdigitated pole members; hub means secured on one of said shaft members and having both groups of said pole members connected therewith; annular inductor means connected with the other shaft member and disposed in a co-operative air-gap relation to said annular series of pole members; pole ring means connected with one group of said pole members and projecting in an axial direction away from said annular series; field means comprising a stationary annular field member and annular field coil means supported thereby, said field member having a pole ring portion projecting axially toward said annular series and disposed in a surrounding overlap relation to said pole ring means; said pole ring means having an internal annular bevel sloping away from said rotation axis for movement therealong toward said field member and said field coil means having a similarly beveled annular peripheral portion adjacent the bevel of said pole ring means.

12. In electromagnetic coupling apparatus; a housing having air inlet and outlet openings; power input and power output shaft members supported in said housing and relatively rotatable on a common axis; rotor means connected with one of said shaft members and comprising an annular series of spaced pole members, and pole ring means projecting axially from said series and connected with alternate pole members of the series; said rotor means having air passages for a flow of cooling air therethrough; field means comprising a field member connected with said housing and having an annular pole ring portion in a co-operating flux-path air-gap relation to said pole ring means; annular inductor means disposed in a co-operating flux-path air-gap relation to said annular series of pole members; flux-producing field coil means on said field member and energizable to cause flux to traverse said field member including said pole ring portion, said pole ring means, said pole members and said inductor means; means connected with the other shaft member and including a support ring means spaced from said inductor means; and an annular series of air impeller blades on one axial side of said inductor means and connecting the latter with said support ring means.

13. Electromagnetic coupling apparatus as defined in claim 12 and comprising a second annular series of air impeller blades located on the other axial side of said inductor means and projecting therefrom.

14. In an electromagnetic coupling, a housing having bearing means therein; relatively rotatable coaxial shaft members operably supported in said housing by said bearing means; a first rotor secured on one of said shaft members and comprising connected rotor components having portions thereof disposed in an annular series as groups of interdigitated pole members; a second rotor connected with another of said shaft members and having inductor means extending annularly of said series in a co-operative air-gap relation to said pole members; one of said rotor components comprising hub means having one group of said pole members connected therewith, and another of said rotor components comprising pole ring means spaced from said hub means and having another group of said pole members connected therewith; and field means comprising a stationary field member connected with said housing and energizable field coil means supported by said field member; said field member having an inner annular portion in a co-operatively spaced flux-path relation to said hub means and an outer annular portion in a co-operatively spaced external surrounding flux-path relation to said pole ring means.

15. In electromagnetic coupling apparatus having power input and power output shaft members relatively rotatable on a common axis; rotor means comprising an annular series of rotatable pole members connected with a hub means secured on said output shaft member; annular inductor means connected with said input shaft member and disposed in a surrounding co-operative air-gap relation to said annular series of pole members; pole ring means connected with said pole members and projecting in an axial direction away from said pole members; and field means comprising an annular field member and field coil means supported thereby; said annular field member having a pole ring portion projecting axially toward said pole members and disposed in a surrounding relation to said coil means and said pole ring means and in an opposed air-gap relation to said pole ring means.

16. In electromagnetic coupling apparatus; first and second power shafts relatively rotatable on a common axis; a first rotor means connected with said first shaft and including annular industor means; a second rotor means connected with said second shaft and including pole means comprising an annular series of spaced pole members in a co-operative relation to said inductor means; and field means comprising a stationary field member and energizable coil means associated with said field member; portions of said rotor means and field means defining a flux path for magnetic flux for producing a coupling action between said first and second rotor means including a first ring means connected with said field member and disposed in surrounding relation to said coil means, and a second ring means connected with said pole means and interposed between said first ring means and said coil means and in an annularly coextending opposed relation to said first ring means.

17. In electromagnetic coupling apparatus; first and second power shafts relatively rotatable on a common axis; a first rotor means connected with said first shaft and including annular inductor means, field means comprising a stationary field member and energizable coil means on said field member; a second rotor means including a support portion adjacent one axial side of said coil means connected with said second shaft and having pole means extending axially therefrom toward said coil means and in a co-operative relation to said inductor means; said axially extending pole means terminating short of the axial side of said coil means opposite said one side; portions of said first and second rotor means and field means defining a flux path for magnetic flux for producing a coupling action between said first and second rotor means during relative rotation therebetween including a portion of said field member and disposed in surrounding relation to said coil means and in an opposed air-gap relation to said pole means.

18. An electromagnetic coupling apparatus as defined in claim 17 wherein said field means has an annular group of air supply openings located inwardly of said ring portion for directing cooling air to the coil means.

19. An electromagnetic coupling apparatus as defined in claim 17 further including an adapter ring means connected with said housing means and having said field means secured thereto, and said field means being comprised of magnetic material and said adapter ring means being comprised of nonmetallic material.

20. In electromagnetic coupling apparatus having power input and power output shaft members relatively rotatable on a common axis, rotor means comprising an annular series of rotatable pole members connected with a hub means secured to one of said shaft members, annular inductor means connected with another of said shaft members and disposed in a surrounding cooperative air-gap relation to said annular series of pole members, pole ring means connected with said pole members and lying in a plane projecting in an axial direction away from said pole members, and field means comprising field coil means and an annular field member supporting said field coil means, said field member having a radially extending portion spaced axially of said pole ring means and intersecting said plane, and a surface portion disposed in a spaced air-gap relation to said pole ring means.

21. An electromagnetic coupling apparatus having power input and power ouput shaft members relatively rotatable on a common axis, rotor means comprising an annular series of rotatable pole members connected with an axially extending hub means secured on one of said shaft members, an annular inductor means connected with the other of said shaft members and disposed in a surrounding co-operative air-gap relation to said annular series of pole members, pole ring means connected with said pole members and projecting in an axial direction away from said pole members toward one end of said pole means and having a first tip portion terminating short of said one end of the hub means, and field means comprising an annular field member and field coil means supported thereby, said annular field member having a radially extending portion and an axially extending second tip portion connected to the radially extending portion, said first and second tip portions being in a spaced air-gap relation and providing a path for magnetic flux therebetween.

References Cited by the Examiner
UNITED STATES PATENTS 3,012,160  12/61  Sturzenegger _____ 310—105
3,047,754   7/62  Jaeschke _____ 310—105
3,072,811   1/63  Jaeschke _____ 310—105

MILTON O. HIRSHFIELD, *Primary Examiner.*

DAVID X. SLINEY, *Examiner.*